US009959254B2

(12) United States Patent
Ayoub et al.

(10) Patent No.: US 9,959,254 B2
(45) Date of Patent: May 1, 2018

(54) REPRESENTATION OF AN ELEMENT IN A PAGE VIA AN IDENTIFIER

(71) Applicant: International Business Machines Corporation, Armonk, NY (US)

(72) Inventors: Khalil A. Ayoub, Ottawa (CA); Gregor von Bochmann, Ottawa (CA); Suryakant Choudhary, Ottawa (CA); Mustafa Emre Dincturk, Ottawa (CA); Paul Ionescu, Kanata (CA); Guy-Vincent Jourdan, Ottawa (CA); Iosif Viorel Onut, Ottawa (CA); Seyed M. Mir Taheri, Ottawa (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 537 days.

(21) Appl. No.: 14/060,177

(22) Filed: Oct. 22, 2013

(65) Prior Publication Data
US 2014/0208198 A1   Jul. 24, 2014

Related U.S. Application Data

(63) Continuation of application No. 13/745,020, filed on Jan. 18, 2013.

(51) Int. Cl.
G06F 17/22 (2006.01)
(52) U.S. Cl.
CPC .................. G06F 17/2247 (2013.01)
(58) Field of Classification Search
IPC .......................... G06F 1/00,17/2229
See application file for complete search history.

(56) References Cited

U.S. PATENT DOCUMENTS

| 5,850,554 | A | * | 12/1998 | Carver | G06F 8/71 717/162 |
|---|---|---|---|---|---|
| 7,310,632 | B2 | | 12/2007 | Meek et al. | |
| 7,599,931 | B2 | | 10/2009 | Shi et al. | |
| 7,698,317 | B2 | | 4/2010 | Sasturkar et al. | |
| 8,489,605 | B2 | | 7/2013 | Ayoub et al. | |
| 2001/0056411 | A1 | * | 12/2001 | Lindskog | G06Q 10/0875 705/76 |
| 2004/0254905 | A1 | * | 12/2004 | Tiku | G06F 17/30899 706/55 |

(Continued)

OTHER PUBLICATIONS

Gibson, David, et al.; "The Volume and Evolution of Web Page Templates"; International World Wide Web Conference Committee (IW3C2); p. 830-839; May 10-14, 2005.

Primary Examiner — Scott Baderman
Assistant Examiner — Steven Golden
(74) Attorney, Agent, or Firm — Cantor Colburn LLP

(57) ABSTRACT

Embodiments are directed to computing, by an apparatus comprising a processing device, an identifier (ID) for an element in a page using an algorithm responsive to encountering the element a first time, causing, by the apparatus, the ID to be stored in a storage device, encountering, by the apparatus, the element a second time, determining, by the apparatus, that the element is encountered the second time, and responsive to determining that the element is encountered the second time, representing, by the apparatus, the element by the ID at the time of the second encounter by retrieving the ID from the storage device.

4 Claims, 6 Drawing Sheets

(56) References Cited

U.S. PATENT DOCUMENTS

| | | | |
|---|---|---|---|
| 2008/0005663 A1* | 1/2008 | Fujimaki | G06F 17/2247 |
| | | | 715/236 |
| 2008/0189302 A1* | 8/2008 | Evani | G06F 17/30917 |
| 2009/0171979 A1* | 7/2009 | Lubarski | G06Q 10/10 |
| 2009/0177959 A1* | 7/2009 | Chakrabarti | G06F 17/2229 |
| | | | 715/234 |
| 2010/0257413 A1* | 10/2010 | Brunet | G06F 17/30899 |
| | | | 714/57 |
| 2010/0268701 A1 | 10/2010 | Zhang et al. | |
| 2011/0289083 A1* | 11/2011 | Fisher | G06F 17/3002 |
| | | | 707/737 |
| 2012/0005211 A1* | 1/2012 | Ayoub | G06F 17/3089 |
| | | | 707/737 |
| 2012/0166936 A1 | 6/2012 | Ayoub et al. | |

* cited by examiner

1. Function Compute DOM ID (Node X)
2. Begin
3.   Input: Node X – the root node of the branch the DOM ID is computed for.
4.   Output: the DOM ID$_{Node\ X}$
5.   Is OuterHTMLHash$_{Node\ X}$ in the history
6.   Begin
7.     Return from history the DOM ID$_{Node\ X}$
8.   End
9.   Else
10.  Begin
11.    If termination condition is NOT reached
12.    Begin
13.      For each Child Y of Node X do
14.      Begin
15.        DOM ID$_{Child\ Y}$ = Compute DOM ID( Child Y)
16.        In the OuterHtml$_{Node\ X}$ replace OuterHtml$_{Child\ Y}$ with DOM ID$_{Child\ Y}$
17.      End
18.    End
19.    In the OuterHtml$_{Node\ X}$ re-arrange the children of Node X by their by the DOM IDs
20.  End
21.  DOM ID$_{Node\ X}$ = DOMMA(OuterHtml$_{Node\ X}$)
22.  Store in the history <OuterHTMLHash$_{Node\ X}$, DOM ID$_{Node\ X}$>
23. End
24. End

FIG. 4

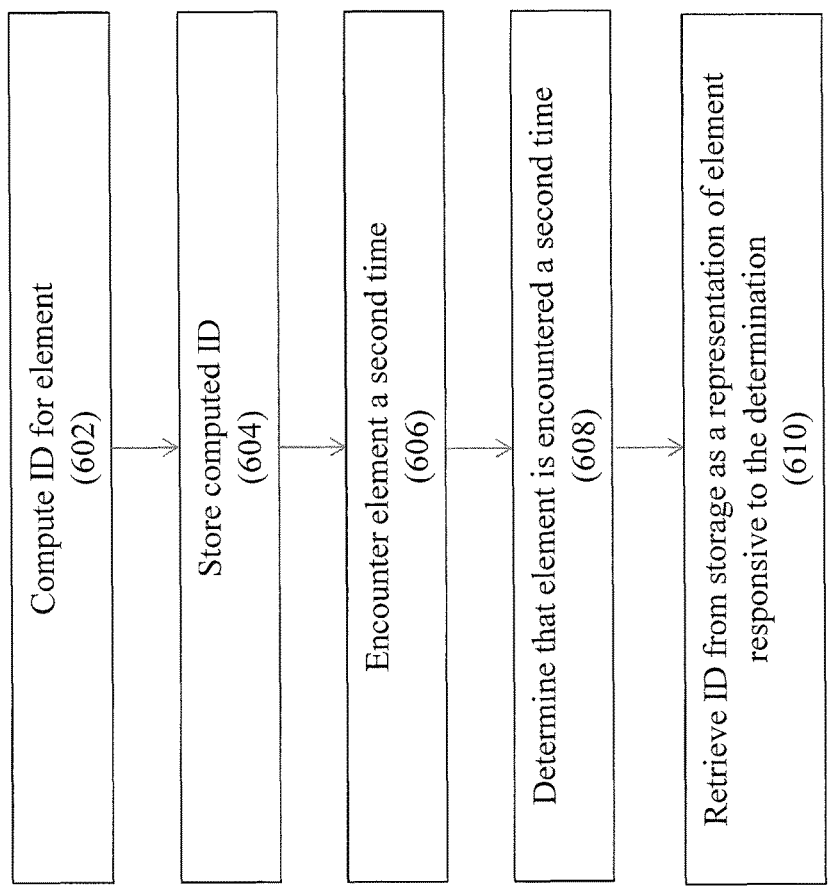

REPRESENTATION OF AN ELEMENT IN A PAGE VIA AN IDENTIFIER

CROSS-REFERENCE TO RELATED APPLICATION

This application is a continuation of U.S. patent application Ser. No. 13/745,020, filed Jan. 18, 2013, the disclosure of which is incorporated by reference herein in its entirety.

BACKGROUND

The present disclosure relates generally to an analysis of data, and more particularly, to an optimization of an algorithm based on an analysis of a page.

Document object model (DOM) algorithms are used extensively in computing applications and environments. For example, a crawler may need to perform computations on a page (e.g., a webpage) to allow the crawler to identify features associated with the page.

It is often desirable to obtain DOM content associated with a page from a programmatic point of view. DOM algorithms may associate an identifier (ID) with the page to determine if a next page being visited is a new or duplicate of one visited previously. Use of an ID may help to avoid ending up in an infinite loop (e.g., exploring pages repeatedly) while covering most of the application (e.g., skipping pages in order to avoid loops but only skipping select pages). Another technique used is a computation of a local sensitive hashing (LSH) key on the components of a page that allows the crawler to understand which parts of the page the crawler explored before and identify pages most similar to a current page.

DOM algorithms work directly on the DOM and frequently manipulate a large amount of text. As such, the DOM algorithms are computationally intensive and often prove to be a limiting factor (e.g., a so-called "bottleneck") in terms of performance or execution time.

BRIEF SUMMARY

An embodiment is directed to a method comprising computing, by an apparatus comprising a processing device, an identifier (ID) for an element in a page using an algorithm responsive to encountering the element a first time, causing, by the apparatus, the ID to be stored in a storage device, encountering, by the apparatus, the element a second time, determining, by the apparatus, that the element is encountered the second time, and responsive to determining that the element is encountered the second time, representing, by the apparatus, the element by the ID at the time of the second encounter by retrieving the ID from the storage device.

An embodiment is directed to a computer program product comprising a computer readable storage medium having computer readable program code embodied therewith, the computer readable program code comprising computer readable program code configured for computing an identifier (ID) for an element in a page using an algorithm responsive to encountering the element a first time, causing the ID to be stored in a storage device, encountering the element a second time, determining that the element is encountered the second time, and responsive to determining that the element is encountered the second time, representing the element by the ID at the time of the second encounter by retrieving the ID from the storage device.

An embodiment is directed to an apparatus comprising at least one processor, and memory having instructions stored thereon that, when executed by the at least one processor, cause the apparatus to compute an identifier (ID) for an element in a page using an algorithm responsive to encountering the element a first time, cause the ID to be stored in a storage device, encounter the element a second time, determine that the element is encountered the second time, and responsive to determining that the element is encountered the second time, represent the element by the ID at the time of the second encounter by retrieving the ID from the storage device.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 4 depicts exemplary code in accordance with one or more embodiments;

FIG. 6 depicts a flow chart of an exemplary method in accordance with one or more embodiments.

DETAILED DESCRIPTION

Figure 1:
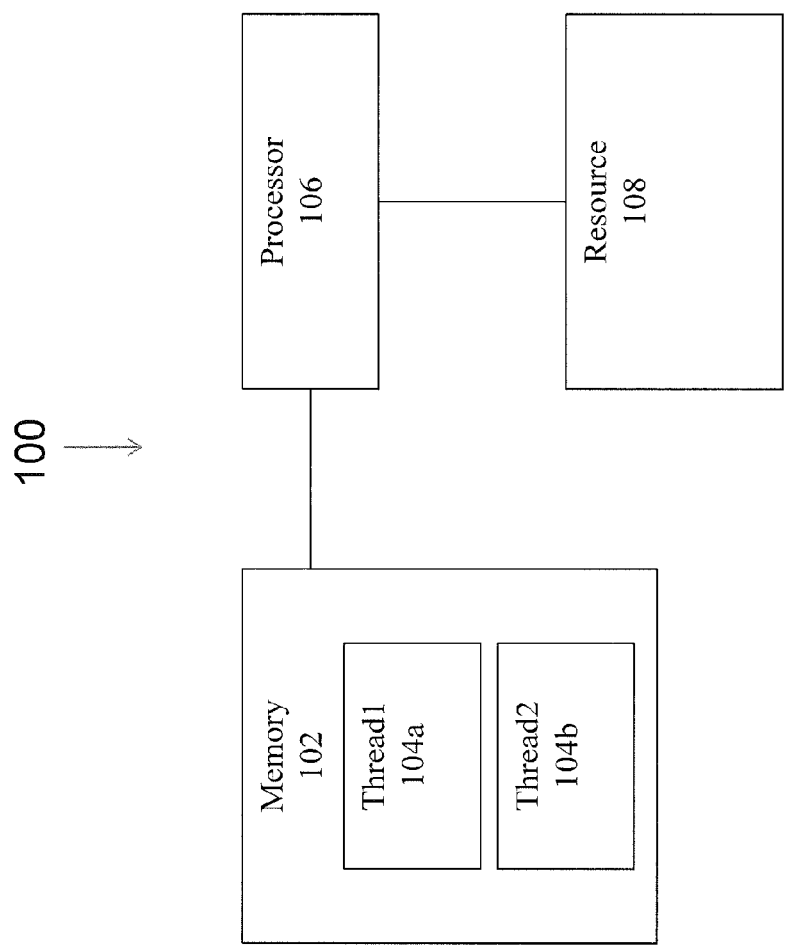
FIG. 1 depicts an exemplary system architecture in accordance with one or more embodiments.

In accordance with various embodiments of the disclosure, one or more algorithms is applied at a granular level, allowing an element of a page to be substituted with, or represented by, an identifier (ID) based on a computation of the ID. The ID may be saved or stored in connection with a history, such that future occurrences of the element in, e.g., the same page or in another page may be referenced using the ID. A re-computation of the ID might be avoided when the ID is available in the history. Embodiments of this disclosure may be applied at any level of abstraction. For example, aspects of the disclosure may be applied in connection with a root node of a page and recursively applied to child nodes, grandchild nodes, great-grandchild nodes, etc., associated with the root node, thereby facilitating a top-down approach. The granularity of the approach may adapt based on the content or elements included in the page.

It is noted that various connections are set forth between elements in the following description and in the drawings. It is noted that these connections in general and, unless specified otherwise, may be direct or indirect and that this specification is not intended to be limiting in this respect.

Referring to FIG. 1, an exemplary system architecture 100 is shown. The architecture 100 is shown as including a memory 102. The memory 102 may store executable instructions. The executable instructions may be stored or organized in any manner. As an example, at least a portion of the instructions are shown in FIG. 1 as being associated with a first thread 104a and a second thread 104b, although any number of threads 104 may be included. The instructions stored in the memory 102 may be executed by one or more processors, such as a processor 106.

The threads 104a and 104b may be associated with a resource 108. For example, the resource 108 may include one or more pages, which may be organized as one or more blocks, objects, fields, strings, elements, or the like. The threads 104a and 104b may access the resource 108 concurrently (e.g., concurrently in terms of time or space), such that the resource 108 may be, or include, a shared resource.

In some embodiments, one or more of the entities shown in FIG. 1 may be replicated. For example, in some systems, multiple computing devices may access the resource 108.

Embodiments of the disclosure may improve an execution time associated with an algorithm, such as a DOM manipulation algorithm (DOMMA). In some embodiments, the techniques described herein are applied to algorithms that exhibit at least two characteristics: (1) computation of an ID in a bottom-up manner (e.g., starting with leaf nodes and continuing up to a root node), and (2) the ID can be computed in a deterministic way (e.g., computing the ID two or more times on the same subject yields the same resultant ID). An optional third characteristic is a so-called screening step, wherein elements that are deemed unimportant are stripped out. As an example of the third characteristic, a banner or advertisement on a webpage might be deemed unimportant in some embodiments and might be disregarded during an analysis of the webpage. In connection with DOM based page uniqueness (DOMBPU) method or algorithm, a user may be able to define which HTML tags are important through a regular expression. Similarly, an LSH algorithm may consider particular HTML nodes.

Figure 2:
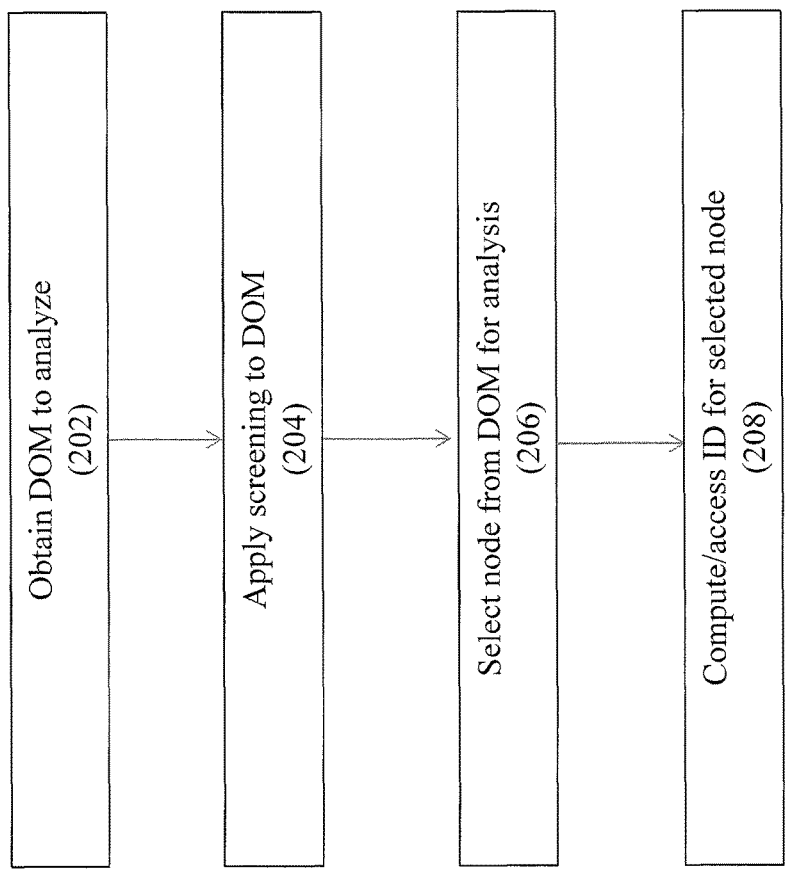
FIG. 2 depicts a flow chart of an exemplary method in accordance with one or more embodiments.

Turning now to FIG. 2, a flowchart of an exemplary method in accordance with one or more embodiments of the disclosure is shown. The method of FIG. 2 is described in connection with a DOM for ease of illustration, although it is understood that the method could be applied to other types of models or algorithms.

In block 202, a DOM to be analyzed may be obtained. For example, the DOM may pertain to a page (e.g., a webpage).

In block 204, a screening may be applied to the DOM obtained in block 202. For example, in connection with the page, one or more elements that are deemed unimportant may be disregarded or discarded.

In block 206, a node of the DOM may be selected for analysis purposes. For example, a root node which may be selected may correspond to an HTML reference to the page, such as a tag (e.g., a start tag) associated with the page.

In block 208, an ID may be computed or accessed for the node selected in block 206, and potentially any other nodes that derive from the selected node (e.g., child nodes, grandchild nodes, etc.). For example, and as described further below, if the ID for a node exists as a stored item in a history, then the ID may simply be obtained without re-computing the ID. If the ID for the node is not available in the history, then the ID may be computed, and the computed ID may then be stored in the history for potential future use/reference.

Figure 3:
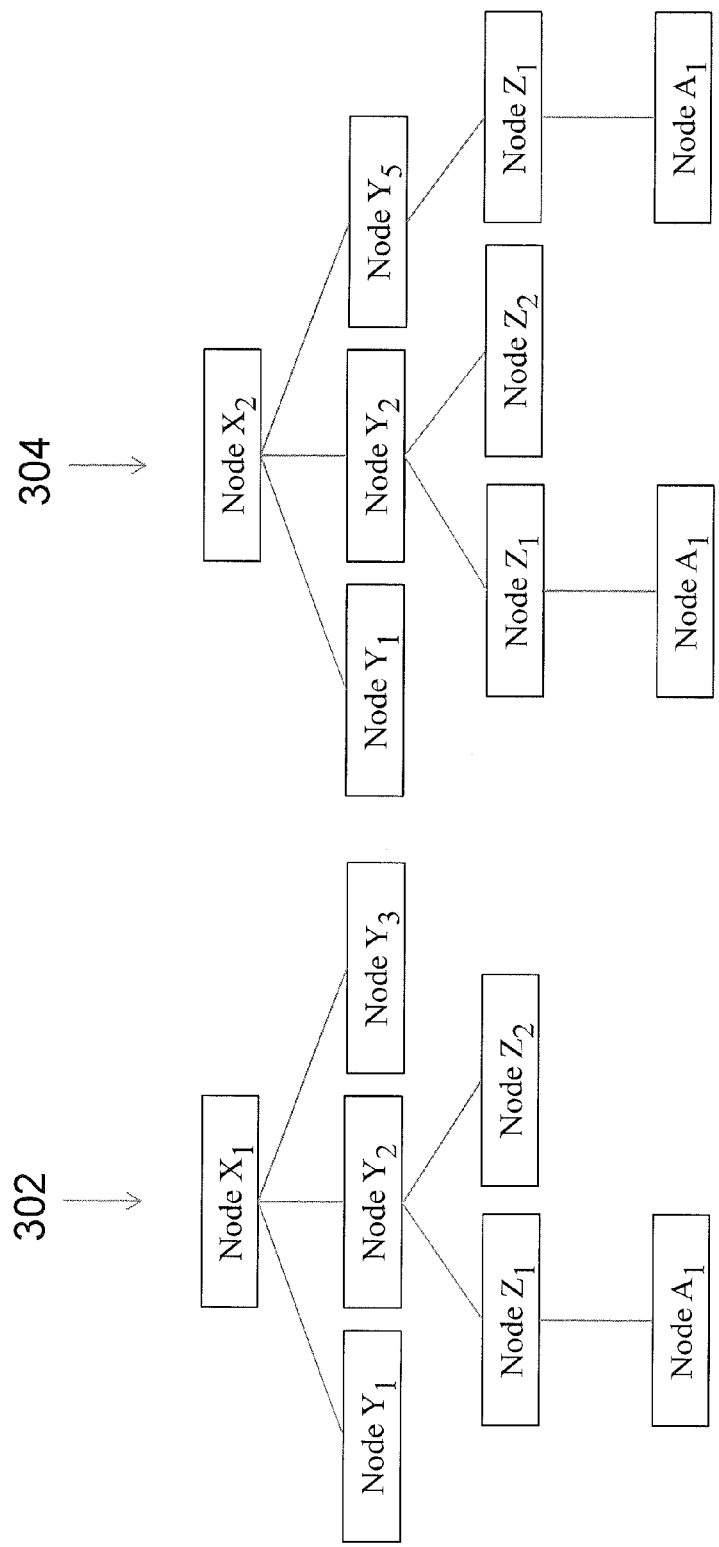
FIG. 3 depicts exemplary graphs in accordance with one or more embodiments.

FIG. 3 illustrates exemplary graphs 302 and 304 that may be associated with two DOMs. For example, the graph 302 may be associated with a first webpage and the graph 304 may be associated with a second webpage. The webpages 302 and 304 may correspond to, or be included in, the resource 108 of FIG. 1. Each of the nodes X, Y, Z, and A described below may be associated with a particular element of the graphs/webpages 302 and 304, such as a particular portion of text, an image, a video, etc. The graphs 302 and 304 are illustrative. In some embodiments, graphs may include more or fewer nodes than what is shown in FIG. 3, and the nodes may be organized or arranged in a manner different from what is shown in FIG. 3.

As shown in FIG. 3, a node $X_1$ may correspond to a root node selected for analysis in connection with the first webpage 302. The node $X_1$ may have child nodes $Y_1$, $Y_2$, and $Y_3$. The node $Y_2$ may in turn have child nodes $Z_1$ and $Z_2$. The node $Z_1$ may in turn have a child node $A_1$. With respect to the webpage/graph 302, the nodes $Z_1$ and $Z_2$ may be referred to as grandchildren of the node $X_1$ and the node $A_1$ may be referred to as a great-grandchild of the node $X_1$.

In a similar manner, a node $X_2$ may correspond to a root node selected for analysis in connection with the second webpage 304. The node $X_2$ may have as child nodes the nodes $Y_1$ and $Y_2$, in addition to a node $Y_5$. The node $Y_5$ may in turn have as a child node the node $Z_1$. The nodes $Z_1$ (with parent nodes $Y_2$ and $Y_5$) may in turn have a respective child node $A_1$. With respect to the webpage/graph 304, the nodes $Z_1$ and $Z_2$ may be referred to as grandchildren of the node $X_2$ and the node $A_1$ may be referred to as a great-grandchild of the node $X_2$.

As shown in FIG. 3, the graphs/webpages 302 and 304 have a number of nodes in common (e.g., $Y_1$, $Y_2$, $Z_1$, $Z_2$, and $A_1$) and a number of nodes that are not in common (e.g., $X_1$, $X_2$, $Y_3$, and $Y_5$). The existence of common nodes between the graphs/webpages 302 and 304 may be exploited when conducting an analysis of the graphs/webpages 302 and 304 as described further below.

FIG. 4 illustrates pseudo code for an exemplary function called "Compute DOM ID" that may be used to compute or access an ID for one or more nodes. In some embodiments, the function of FIG. 4 may be used to implement (a portion of) the method of FIG. 2, such as the block 208.

In FIG. 4, DOM $ID_{Node\ x}$ represents the DOM ID of Node X. OuterHtml$_{Node\ x}$ represents the OuterHTML of Node X. OuterHTMLHash$_{Node\ x}$ represents a hash value computed on OuterHtml$_{Node\ x}$.

At line number 1 of FIG. 4, the function Compute DOM ID is called with the input argument Node X. Assuming that the function was initially called with respect to the graph/webpage 302 of FIG. 3, the Node X input argument may (initially) correspond to the node $X_1$ of FIG. 3.

Line numbers 5-8 of FIG. 4 may correspond to a check to see if a history is available for the node that is the input argument of the function call. If the history is available for the node that is the input argument of the function call, the DOM ID for that node may be obtained or accessed from the history and the function may effectively end. Otherwise, if a history is not available for the node, the code sequence corresponding to the lines 9-23 may execute. The history for a given node may be implemented using one or more techniques, such as using a hash table.

Line numbers 13-17 of FIG. 4 represent a loop (e.g., a "for loop") for computing a DOM ID for child nodes of the node that is the input argument to the function call. In particular, line number 15 represents a recursive call of the function. Line number 16 effectively captures or stores the result of the execution of line number 15 in OuterHtml$_{Node\ x}$.

Line number 19 of FIG. 4 may be used to sort children nodes of Node X by their DOM IDs. In some embodiments, the sorting may be done in an ascending or descending order, so long as the sorting technique applied remains consistent.

Line number 19 may be used to solve a problem of children re-shuffling, and may provide a consistent way to propagate IDs from children to parent.

Line number 21 of FIG. 4 may correspond to a call (e.g., an external call) to an algorithm, such as a DOMMA algorithm. For example, in connection with a DOM based page uniqueness (DOMBPU) method or algorithm, the execution of line number 21 of FIG. 4 may entail one or more of: (1) grouping similar children of a DOM, (2) stripping repeated elements within a single parent, and (3) repeating (1) and (2) until there are no more duplicates to group.

Line number 22 of FIG. 4 may correspond to saving results of the analysis in history for potential future use.

The function of FIG. 4 may execute in a top-down manner with respect to nodes of a graph. For example, the function may be called with a root node and the function may progressively work its way through the remainder of the nodes associated with the root node in an efficient and systematic manner.

In terms of the operations associated with line numbers 12-20, the execution of those operations may be based on a state of a "termination condition" as provided in line number 11. For example, in some instances it might not be desirable to continue recursively calling the function. A termination condition may be reached when one or more of the following conditions are satisfied: (1) node X is a leaf node (e.g., there are no additional opportunities to go further down in the recursion), (2) node X is at a level in the (page) DOM that exceeds a predefined maximum depth (e.g., it is undesirable to go further in the recursion), and (3) the size of the history becomes larger than a maximum predefined value.

Assuming that the function of FIG. 4 is first called with respect to the graph/webpage 302, and assuming that a history is not available with respect to the nodes of the graph/webpage 302 when the function is called, then the code associated with lines 9-23 may execute for each of the nodes of the graph/webpage 302 (assuming that the termination condition of line number 11 is not reached).

Figure 5:
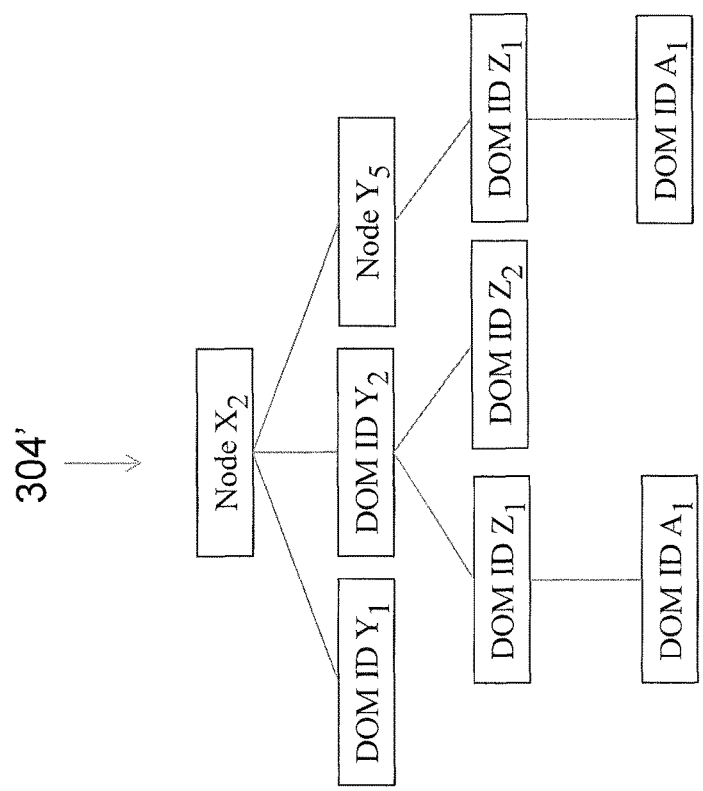
FIG. 5 depicts an exemplary graph in accordance with one or more embodiments.

If the function of FIG. 4 is next called with respect to the graph/webpage 304, and assuming that an analysis was not previously conducted specifically with respect to the graph/webpage 304, the code associated with lines 9-23 might not need to execute for each of the nodes of the graph/webpage 304. For example, the code associated with lines 9-23 might not need to execute for each of the nodes due to the history that was obtained in analyzing the graph/webpage 302, and more particularly, the nodes in common between the graphs/webpages 302 and 304. For example, FIG. 5 shows a graph 304' which may be analogous to the graph 304 of FIG. 3. Relative to the graph 304 of FIG. 3, the nodes $Y_1$, $Y_2$, $Z_1$, $Z_2$, and $A_1$ have been replaced with their respective DOM IDs in the graph 304' of FIG. 5. Accordingly, a DOM ID might not be computed for the nodes $Y_1$, $Y_2$, $Z_1$, $Z_2$, and $A_1$ when analyzing the graph 304/304', given that the DOM IDs for those nodes is available in the history.

A number of generalizations may be made regarding the techniques described herein. In some embodiments, an encoding may include one or more of a hash, a checksum, MD*, sha*, ripemd*, tiger*, haval*. In some embodiments, an encoding (e.g., a hash encoding) might not be used. In such embodiments, the decision block "Is OuterHTMLHash$_{Node\ x}$ in the history" may be replaced by "Is OuterHtml$_{Node\ x}$ in the history" in connection with line number 5 of FIG. 4.

FIG. 6 illustrates a flow chart of a method that may be used in connection with one or more embodiments. The method of FIG. 6 may be used to compute and access an ID for, e.g., an element or node of a page.

In block 602, an identifier (ID) for an element in a page may be computed using an algorithm. The computation may be triggered in response to encountering the element in an analysis of the page and may be based on a determination that an ID for the element is not available in a history.

In block 604, the ID computed in block 602 may be stored. The ID may be stored in the event that the element is encountered again in the future.

In block 606, the element may be encountered a second time. For example, the element may be encountered on the same page or a different page.

In block 608, a determination may be made that the element is encountered the second time.

In block 610, responsive to determining that the element is encountered a second time, the element may be represented by the ID at the time of the second encounter by retrieving the ID from the storage.

In some embodiments various functions or acts may take place at a given location and/or in connection with the operation of one or more apparatuses or systems. In some embodiments, a portion of a given function or act may be performed at a first device or location, and the remainder of the function or act may be performed at one or more additional devices or locations.

In some embodiments, an apparatus or system may comprise at least one processor, and memory storing instructions that, when executed by the at least one processor, cause the apparatus or system to perform one or more methodological acts as described herein. In some embodiments, the memory may store data, such as one or more structures, metadata, lines, tags, blocks, strings, etc.

Aspects of the disclosure may be applied in connection with one or more applications or environments. For example, aspects of the disclosure may be used in connection with web applications (e.g., WEB 2.0 applications).

Embodiments of the disclosure may be used to enhance or improve the performance or execution time of an algorithm. Such a speed improvement may be based on observing that: (1) actions in algorithms (e.g., DOMMA algorithms) are frequently computationally intensive, (2) in many cases, the same computation is needed more than once, (3) in many cases, different DOMs have common parts or elements, (4) common parts across various DOMs may be placed in different locations in a DOM structure (e.g., a window may be moved from one side of a page to a different side of the page across DOMs), yet the computation results for a first DOM can be shared with respect to other DOMs, and (5) hashing and/or other techniques may be used to minimize an amount or density of memory that is used.

As will be appreciated by one skilled in the art, aspects of this disclosure may be embodied as a system, method or computer program product. Accordingly, aspects of the present disclosure make take the form of an entirely hardware embodiment, an entirely software embodiment (including firmware, resident software, micro-code, etc.) or as embodiments combining software and hardware aspects that may all generally be referred to herein as a "circuit," "module" or "system." Furthermore, aspects of the disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific example (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming language, including an object oriented programming language such as Java, Smalltalk, C++ or the like and conventional procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the disclosure may be tied to particular machines. For example, in some embodiments one or more devices (e.g., a computing device, such as a personal computer, a laptop computer, a mobile device (e.g., a smartphones), a server, etc.) may analyze a resource or DOM by applying an algorithm at a granular level. In some embodiments, the one or more devices may substitute an element or node of the resource with an ID. The ID may serve as a representation of a subtree, such that elements or nodes that are derived from the ID may be represented in the subtree with their own respective IDs. The ID(s) may be stored in connection with one or more storage devices (e.g., one or more memories, databases, etc.). In some embodiments, the one or more devices may include a compiler.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There may be many variations to the diagram or the steps (or operations) described therein without departing from the spirit of the disclosure. For instance, the steps may be performed in a differing order or steps may be added, deleted or modified. All of these variations are considered a part of the disclosure.

It will be understood that those skilled in the art, both now and in the future, may make various improvements and enhancements which fall within the scope of the claims which follow.

What is claimed is:

1. A method performed by a compiler of the processor comprising:
    encountering a first element in a web page for a first time;
    computing, by the compiler of the processor coupled to a memory, a first identifier for the first element using an algorithm responsive to the encountering of the first element,
    wherein the first identifier represents a subtree;
    causing, by the compiler, the first identifier to be stored in a storage device using a hash representation of the first identifier to minimize a density of the storage device that is used when a history is unavailable for the first element in the storage device,
    wherein the first identifier is available without re-computing the first identifier when the first identifier exists as the hash representation in the history, and
    wherein a re-computing of the first identifier for the first element using the algorithm responsive to the encountering of the first element is performed and the re-computed first identified is stored as the hash representation in the history for future reference when the first identifier does not exists as the hash representation in the history;
    subsequently encountering, by the compiler, the first element two or more times in a different location of the web page and in a second web page;
    representing, by the compiler, the first element two or more times time of the subsequent encounters by retrieving the first identifier from the storage device,
    wherein the algorithm computes the first identifier in a bottom-up fashion starting with leaf nodes and continuing to a root node, in a deterministic way to yield the first identifier when computing the first identifier, and wherein the algorithm computes the first identifier in screening operation that comprises a first stripping out of the first element when it is deemed unimportant, a grouping of similar leaf nodes under the root node, a second stripping out of the first element when the first element is repeated two or more times within the similar leaf nodes under the root node, and repeating the grouping and the second stripping until there are no more duplicates to group; and recursively computing respective unique identifiers for each of one or more subsequent elements derived from the first element, wherein each of the one or more subsequent elements derived are from the first identifier and represented in the subtree by the respective unique identifiers, wherein the recursive computing includes:
  encountering a second element in a web page for a second time,
  wherein the second element is derived from the first identifier;
  computing a second identifier for the second element using the algorithm,
  wherein second identifier is based on having encountered the second element, is different than the first identifier, and is stored within the subtree represented by the first identifier;
  causing the second identifier to be stored in the storage device using a hash representation of the second identifier to minimize the density of the storage device that is used;
  subsequently encountering the second element two or more times in a second different location of the web page and in the second web page; and
  representing the second element by the second identifier at the time of the subsequent encounters by retrieving the second identifier from the storage device.

2. The method of claim 1, wherein the algorithm comprises at least the following characteristics:
  a specification of one or more elements that are determined not to be important to the algorithm such that the one or more elements are ignored when computing the ID.

3. The method of claim 1, further comprising:
  computing, by the processor, a third identifier for a third element in the web page based on having encountered the element the first time; and
  causing, by the processor, the third identifier to be stored in the storage device,
  wherein the third element is derived from the second element.

4. The method of claim 1, wherein the element is deemed unimportant based on user defined HyperText Markup Language tags.

* * * * *